United States Patent
Sekikawa (10) Patent No.: US 7,639,436 B2
(45) Date of Patent: Dec. 29, 2009

(54) OPTICAL MODULE HAVING THE LIGHT INCIDENT SURFACE OF A LENS INCLINED ON A SUBSTRATE AND A METHOD OF MANUFACTURING THE SAME

(75) Inventor: Ryo Sekikawa, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 114 days.

(21) Appl. No.: 11/905,363

(22) Filed: Sep. 28, 2007

(65) Prior Publication Data
US 2008/0239520 A1 Oct. 2, 2008

(30) Foreign Application Priority Data
Sep. 29, 2006 (JP) .............................. 2006-270004

(51) Int. Cl.
*G02B 7/02* (2006.01)
(52) U.S. Cl. ...................................... 359/819; 359/811
(58) Field of Classification Search ................. 359/819, 359/811, 809; 372/98, 93, 99, 50.23, 50.1
See application file for complete search history.

(56) References Cited
U.S. PATENT DOCUMENTS
6,717,753 B2 * 4/2004 Sasaki ........................ 359/819

7,111,993 B2 9/2006 Mori
2006/0115207 A1 6/2006 Uekawa et al.

FOREIGN PATENT DOCUMENTS
CN 1542492 A 11/2004
EP 1 335 226 A2 8/2003

OTHER PUBLICATIONS
Hironori Sasaki et al., "Packaging Technologies for Precise Alignment of Light Sources and Silicon Microlenses," Journal of Japan Institute of Electronics Packaging, vol. 5, No. 5, pp. 466-472 (2002).

* cited by examiner

Primary Examiner—Hung X Dang
(74) Attorney, Agent, or Firm—Rabin & Berdo, PC (57) ABSTRACT

An optical module having a substrate which includes a light-emitting device mounting area provided on its first principal surface, a lens mounting groove with a cross section of V shape, and a support groove formed orthogonal to the lens mounting groove, and an inclined surface to allow a lens element to slide therealong. The support groove includes a bottom surface, a first side surface toward the light-emitting device mounting area, a second side surface opposed to the first side surface, and a first and a second portion defined by the lens mounting groove. The inclined surface is provided on at least one of the side surfaces. Thus, light would not be reflected by the optical module to be returned to a light source.

18 Claims, 8 Drawing Sheets

OPTICAL MODULE HAVING THE LIGHT INCIDENT SURFACE OF A LENS INCLINED ON A SUBSTRATE AND A METHOD OF MANUFACTURING THE SAME

BACKGROUND OF THE INVENTION

1. Field of the Invention

The present invention relates to an optical module that includes a light-emitting device and a lens element on which signal light impinges from the light-emitting device, and a method of manufacturing the same.

2. Description of the Background Art

A transmissive type of diffraction lens element is known which has its successive-plane structure causing a diffraction phenomenon to thereby control incident light. Such a diffraction lens element is mounted, for example, on a substrate and is used in an optical module as a component that collects light emitted from a semiconductor laser, or laser diode, i.e. an optical signal.

In one known configuration, the substrate of an optical module has a groove cut therein with a cross section of, for example, V shape, and the diffraction lens element is provided on the substrate so that its light-incident plane is orthogonal to the direction in which the groove extends, see, for example, U.S. patent application publication No. US2006/0115207 A1 to Uekawa et al.

It is also known in the art that in a method of manufacturing an optical module suitably applied to an optical coupler system which includes a semiconductor laser emits an optical signal, which is then collected by a first lens, through which the optical signal passing is then collected by the second lens, through which the optical signal passing is then incident on a single-mode optical fiber, high mounting accuracy is required particularly in order to mount the first lens on the surface of the substrate as a diffraction lens element, see, for example, Hironori Sasaki et al., "Packaging Technologies for Precise Alignment of Light Sources and Silicon Microlenses," Journal of Japan Institute of Electronics Packaging, Vol. 5, No. 5, pp. 466-472 (2002).

High mounting accuracy is required in order that the semiconductor laser has its laser beam spot size diameter very much different from the spot size diameter of the single mode fiber. Generally, the assembling of diffraction lens elements is carried out to adjust the alignment thereof without operating the semiconductor laser, i.e. the passive alignment assembling. The mounting accuracy is thus dependent upon the dimensional accuracy of alignment marks provided with accuracy in advance, the diffraction lens element or the like.

In the above exemplified configuration of the optical module, i.e. where the diffraction lens element is provided on the substrate so that its light-incident plane is orthogonal to the extending direction of the groove, however, a problem arises that the transmissive diffraction lens element, particularly when made of silicon, has its surface on the light-incident side formed with a convex pattern which is almost the same in height as the reflective diffraction lens element and has its surface on the light-emanating side, opposite to the incident side formed flat so that part of the incident light, i.e. signal light to the diffraction lens is inevitably reflected and returned to the light-emitting device serving as an optical source.

The part of light reflected and returned to the light-emitting device, i.e. a so-called fed-back light may then provide unstable oscillation of the light-emitting device. The fed-back light may also cause a so-called feedback light noise, which may deteriorate the properties of the signal light.

SUMMARY OF THE INVENTION

It is therefore an object of the present invention to provide an optical module including a light-emitting device and a lens element with the deterioration of optical signal properties minimized.

In accordance with the present invention, an optical module comprises an optical module including: a substrate having a first principal surface and a second principal surface opposed to the first principal surface, a light-emitting device mounting area provided on the first principal surface, a lens mounting groove with a cross section of generally V shape, and a support groove provided substantially orthogonal to the lens mounting groove, the support groove including, a bottom surface, a first side surface toward the light-emitting device mounting area, and a second side surface opposed to the first side surface, the support groove being divided into first portion and a second portion by the lens mounting groove.

An optical module in accordance with the invention also includes a light-emitting device including an exit end plane for exit light, the light-emitting device being mounted in the light-emitting device mounting area.

An optical module in accordance with the invention further includes a lens element including (a) a lens including an incident plane and a light exit plane opposed to the lens incident plane, either one or both of the light incident plane and the light exit plane forming a flat surface, the light incident plane being opposed to the exit end plane of the light-emitting device, the optical axis of exit light from the exit end plane reaching the light incident plane, the lens being mounted in the lens mounting groove, and (b) a columnar lens support portion integrated with the lens, the lens support portion extending substantially in parallel with the flat surface formed by the lens incidence or exit plane, the lens support portion including a support bottom surface and a first and a second side surface that are opposed across the support bottom surface, and the lens support portion being fastened with the support bottom surface in contact with the bottom surfaces of the first and second portions of the support groove.

Either one of the first and second side surfaces of the first portion of the support groove is formed as an inclined surface that has a slope reducing an area of the bottom surface, the lens element is oriented not in parallel, with the flat surface of the lens not perpendicular to the optical axis, to the extending direction of the support groove at an angle where light reflected from the lens element is not incident on the exit end plane of the light-emitting device.

An optical module in accordance with the invention includes an optical module including a substrate having a first principal surface and a second principal surface opposed to the first principal surface, a plurality of side surfaces between the first and second principal surfaces, a light-emitting device mounting area provided on the first principal surface, a lens mounting groove with a cross section of V shape, the lens mounting groove being formed from the first principal surface into a thickness of the substrate and extending from an end portion of the light-emitting device mounting area to one of the side surfaces, and a support groove formed substantially orthogonal to the lens mounting groove from the first principal surface into a thickness of the substrate, the support groove including a bottom surface, a first side surface toward the light-emitting device mounting area, and a second side surface opposed to the first side surface, the support groove being divided into a first portion and a second portion by the lens mounting groove.

An optical module in accordance with the invention also includes a light-emitting device having an exit end plane for exit light, the light-emitting device being mounted in the light-emitting device mounting area with an optical axis of exit light coincident with the extending direction of the lens mounting groove, and a lens element which includes (a) a lens including an incident plane and a light exit plane opposed to the light incident plane, either one or both of the light incident plane and the light exit plane forming a flat surface, the light incident plane being opposed to the exit end plane of the light-emitting device, the optical axis of exit light from the exit end plane reaching the light incident plane, the lens being mounted in the lens mounting groove, and (b) a columnar lens support portion integrated with the lens, the lens support portion extending substantially in parallel with the light incident plane, the lens support portion including a support bottom surface and a first and a second side surface that are opposed across the support bottom surface, and the lens support portion being fastened with the support bottom surface in contact with the bottom surfaces of the first and second portions of the support groove.

Either one of the first and second side surfaces of the first portion of the support groove forms an inclined surface that has a slope reducing an area of the bottom surface, and the lens element contacts an edge formed by the support bottom surface of the lens support portion and a side surface opposed to the inclined surface to an intersection where a first boundary between the inclined surface and the lens mounting groove intersects a second boundary between the inclined surface and the bottom surface, the lens element being oriented not in parallel, with the flat surface of the lens being not perpendicular to the optical axis, to the extending direction of the support groove at an angle where light reflected from the lens element is not incident on the exit end plane of the light-emitting device.

According to a method of manufacturing an optical module in accordance with the invention, a substrate is provided which includes a first principal surface and a second principal surface opposed to the first principal surface, a light-emitting device mounting area provided on the first principal surface, a lens mounting groove with a cross section of generally V shape, and a support groove formed substantially orthogonal to the lens mounting groove, the support groove having a bottom surface, a first side surface toward the light-emitting device mounting area, and a second side surface opposed to the first side surface, the support groove being divided into a first portion and a second portion by the lens mounting groove, either one of the first and second side surfaces of the first portion of the support groove being an inclined surface that has a slope reducing an area of the bottom surface.

A lens element is provided which includes (a) a lens having an incident plane and a light exit plane opposed to the light incident plane, either one or both of the light incident plane and the light exit plane forming a flat surface, and (b) a columnar lens support portion integrated with the lens, the lens support portion extending substantially in parallel with the lens incidence or exit plane that is a flat surface, the lens support portion including a support bottom surface and a first and a second side surface that are opposed across the support bottom surface.

The light-emitting device is mounted in the light-emitting device mounting area with an optical axis of exit light coincident with the extending direction of the lens mounting groove.

The incident plane is opposed to the exit end plane of the light-emitting device mounted in the light-emitting device mounting area so that the optical axis reaches the light incident plane, the lens element is rotated and moved, and the lens element is provided in the lens mounting groove, with the flat surface of the lens not perpendicular to the optical axis, as the lens element being oriented not in parallel to the extending direction of the support groove at an angle where light reflected from the lens element is not incident on the exit end plane of the light-emitting device.

According to a method of manufacturing an optical module in accordance with the invention, a substrate is provided which includes a first principal surface and a second principal surface opposed to the first principal surface, a plurality of side surfaces between the first and second principal surfaces, a light-emitting device mounting area provided on the first principal surface, a lens mounting groove with a cross section of generally V shape, the lens mounting groove being provided from the first principal surface into a thickness of the substrate and extending from an end portion of the light-emitting device mounting area to one of the side surfaces, and a support groove provided substantially orthogonal to the lens mounting groove and provided from the first principal surface into a thickness of the substrate, the support groove including a bottom surface, a first side surface toward the light-emitting device mounting area, and a second side surface opposed to the first side surface, the support groove being divided into a first portion and a second portion by the lens mounting groove, either one of the first and second side surfaces of the first portion of the support groove being an inclined surface that has a slope reducing an area of the bottom surface, the support groove including an intersection where a first boundary between the inclined surface intersects the lens mounting groove and a second boundary between the inclined surface and the bottom surface.

A lens element is provided that includes (a) a lens including an incident plane and a light exit plane opposed to the light incident plane, either one or both of the light incident plane and the light exit plane forming a flat surface, and (b) a columnar lens support portion integrated with the lens, the lens support portion extending substantially in parallel with the lens incidence or exit plane that is a flat surface, the lens support portion including a support bottom surface and a first and a second side surface that are opposed across the support bottom surface.

The incident plane is opposed to the exit end plane of the light-emitting device mounted in the light-emitting device mounting area so that the optical axis reaches the light incident plane, the lens element is rotated, using the first boundary as a supporting point, about an axis of the lens element that passes through a center of an extending length and a width of the lens element as viewed from above the lens element and that extends substantially perpendicular to the first principal surface of the substrate, along the first boundary and the inclined surface, the lens element is moved until a first edge contacts with the bottom surface of the support groove and the intersection where the first boundary and the second boundary intersect each other, the first edge is defined by the support bottom surface of the lens support portion and the first or second side surface opposed to the inclined surface, the lens element is provided in the lens mounting groove, with the flat surface of the lens not perpendicular to the optical axis, as the lens element being oriented at an angle where light reflected from the lens element is not incident on the exit end plane of the light-emitting device.

Providing the lens element in the lens mounting groove may include rotating and moving the lens element until an apex of the first edge contacts with the first or second side surface in the first or second portion that is opposite across the lens mounting groove to the inclined surface, the first or second side surface being on the same side as the inclined surface.

Providing the lens element in the lens mounting groove may include rotating and moving the lens element until an apex of a second edge contacts with the first or second side surface opposed to the inclined surface, the second edge being defined by the bottom surface of the lens element support portion and the first or second side surface not opposed to the inclined surface.

A substrate advantageously manufactured by a method of the present invention includes: a first principal surface and a second principal surface opposed to the first principal surface; a plurality of side surfaces between the first and second principal surfaces; a light-emitting device mounting area provided on the first principal surface; a lens mounting groove with a cross section of generally V shape, the lens mounting groove being provided from the first principal surface into a thickness of the substrate and extending from an end portion of the light-emitting device mounting area to one of the side surfaces; and a support groove formed substantially orthogonal to the lens mounting groove from the first principal surface into a thickness of the substrate, the support groove including a bottom surface, a first side surface toward the light-emitting device mounting area, and a second side surface opposed to the first side surface, the support groove being divided into a first portion and a second portion by the lens mounting groove.

According to the configuration of the optical module in accordance with the invention, the substrate is provided with a support groove having an inclined surface, so that the incident plane of the lens element may remain oriented not perpendicular to the optical path axis of signal light more stably.

Light reflected from the lens element may thus be effectively prevented from being returned as fed-back light to a light-emitting device serving as a light source, thereby effectively preventing the operation failure of the light-emitting device due to such fed-back light. The degradation of signal light emitted from the light-emitting device may therefore be prevented, thus transmitting the optical signal more reliably.

According to the method of manufacturing an optical module in accordance with the invention, a substrate provided with a lens mounting groove having an inclined surface is used to mount the lens element by sliding it along the slope of the lens mounting groove. Thus, the mounting position of the lens element, i.e. the inclination of the incident plane of the lens element with respect to the optical axis may be determined only by the assembling process without additional tools or steps.

Without increase of the manufacturing cost, therefore, an optical module may be manufactured which includes a lens element having its light incident plane oriented at any suitable angle not perpendicular to the optical axis of signal light.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

With reference to the accompanying drawings, a preferred embodiment of the invention will be described below. It is to be noted that the drawings generally show the shape, the size, and the arrangement of constituent components to the extent that the present invention can be understood, and the invention is not limited specifically thereto. Although the following discussion is directed to specific materials, conditions, and numerical values and the like, they are provided simply as preferred examples, and the invention is not limited to such specific examples.

Figure 1A:
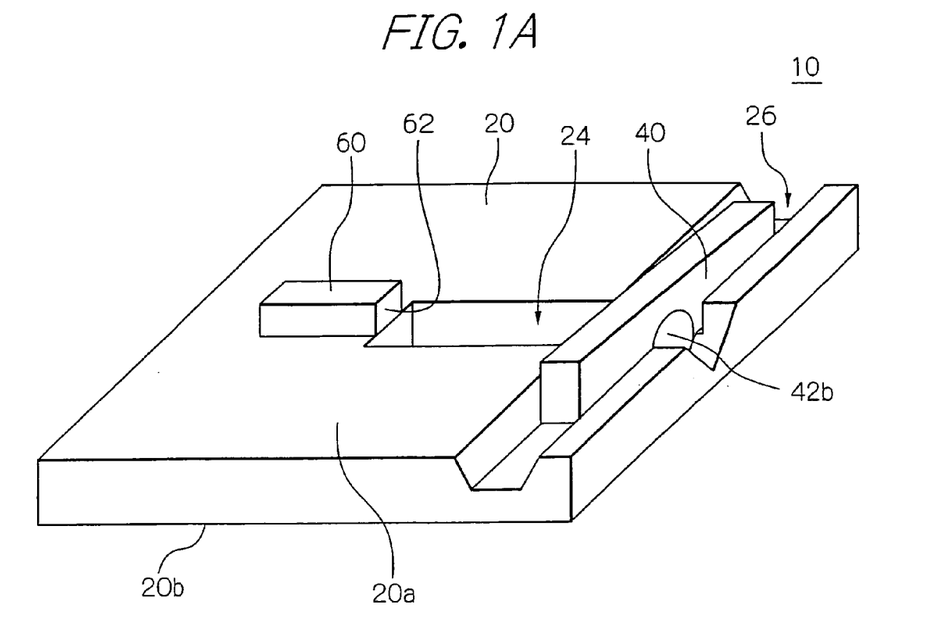
FIG. 1A is a schematic perspective view of an optical module of an illustrative embodiment in accordance with the present invention.
Figure 1B:
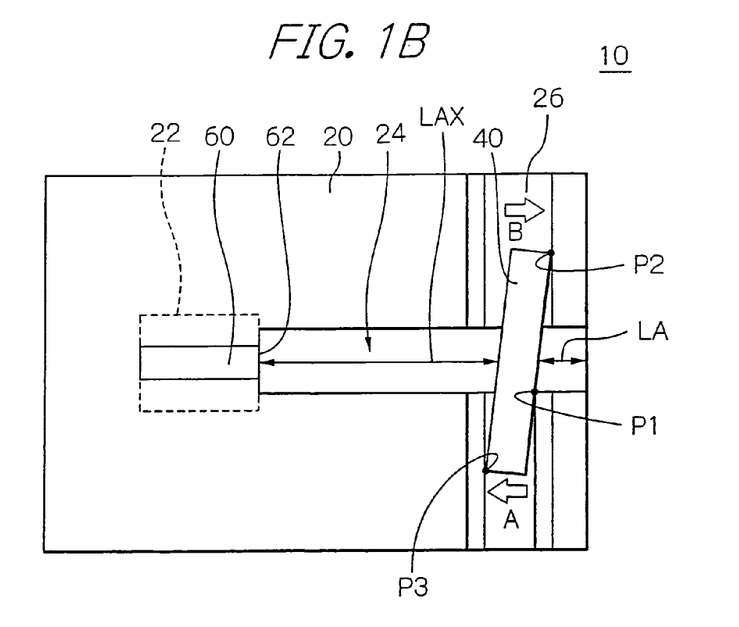
FIG. 1B is a schematic top view of the optical module of the embodiment as viewed from the above in FIG. 1A.
Figure 2:
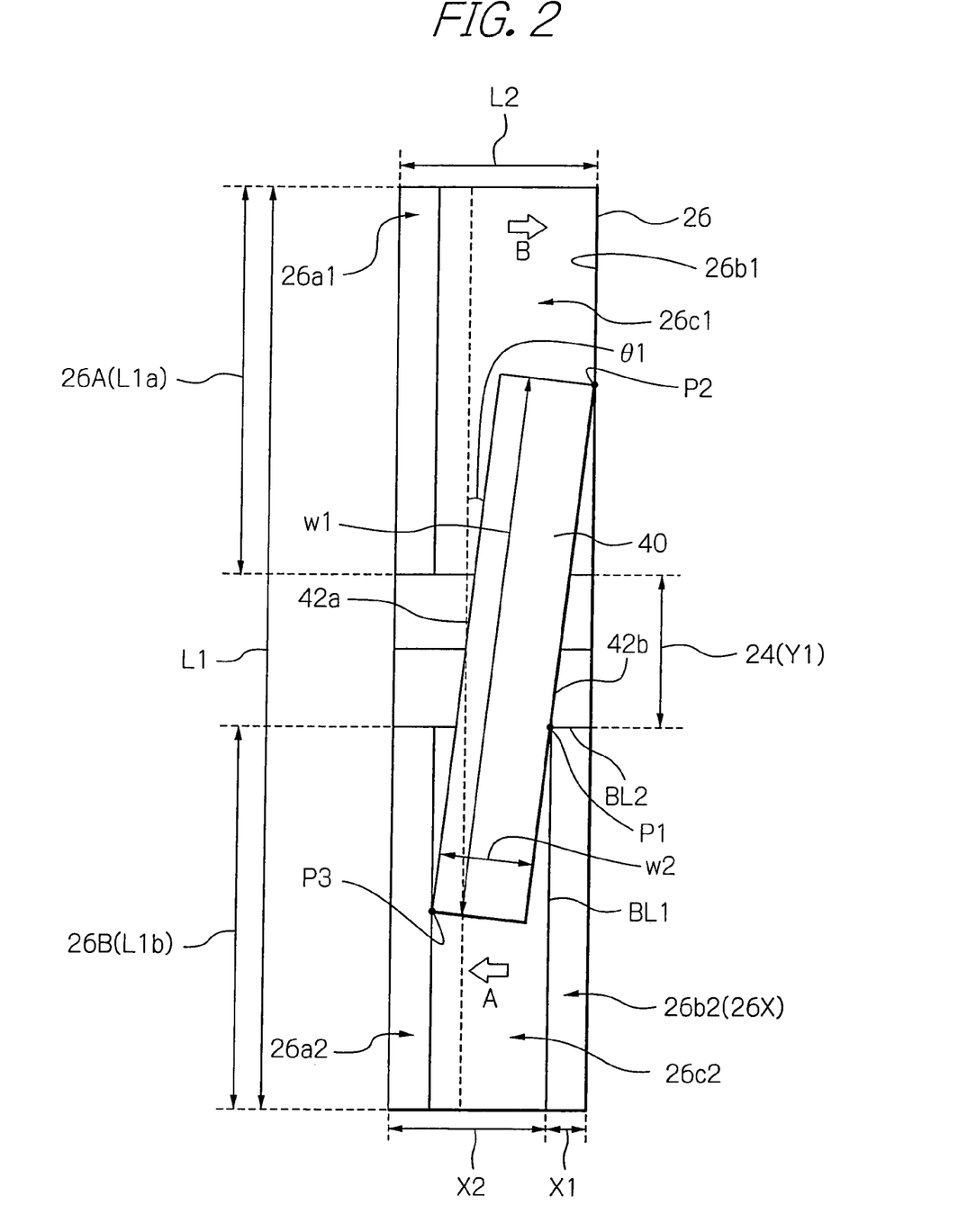
FIG. 2 is an enlarged plan view showing a portion of the optical module shown in FIG. 1B.

Referring first to FIGS. 1A, 1B and 2, an illustrative embodiment of the configuration of an optical module 10 according to the invention will be described. FIG. 1A is a schematic perspective view of an optical module of the embodiment, and FIG. 1B is a schematic top view of the optical module as viewed from the above in FIG. 1A. FIG. 2 depicts, in an enlarged view, part, particularly a support groove, of the optical module of the embodiment.

Figure 3A:
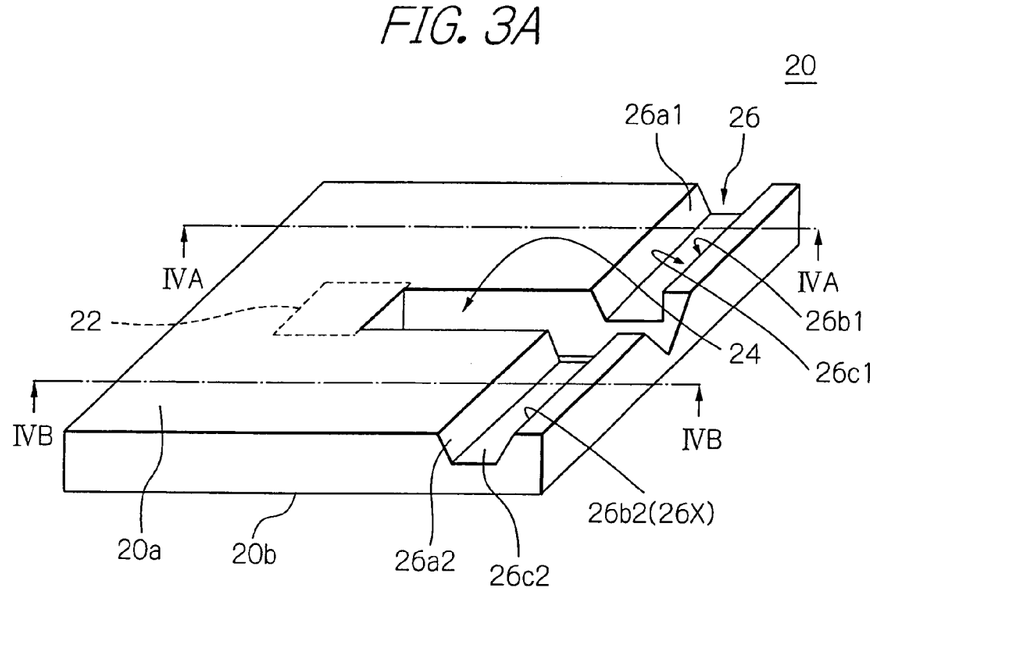
FIG. 3A is a schematic perspective view of a substrate suitably applied to the optical module shown in FIG. 1A.
Figure 3B:
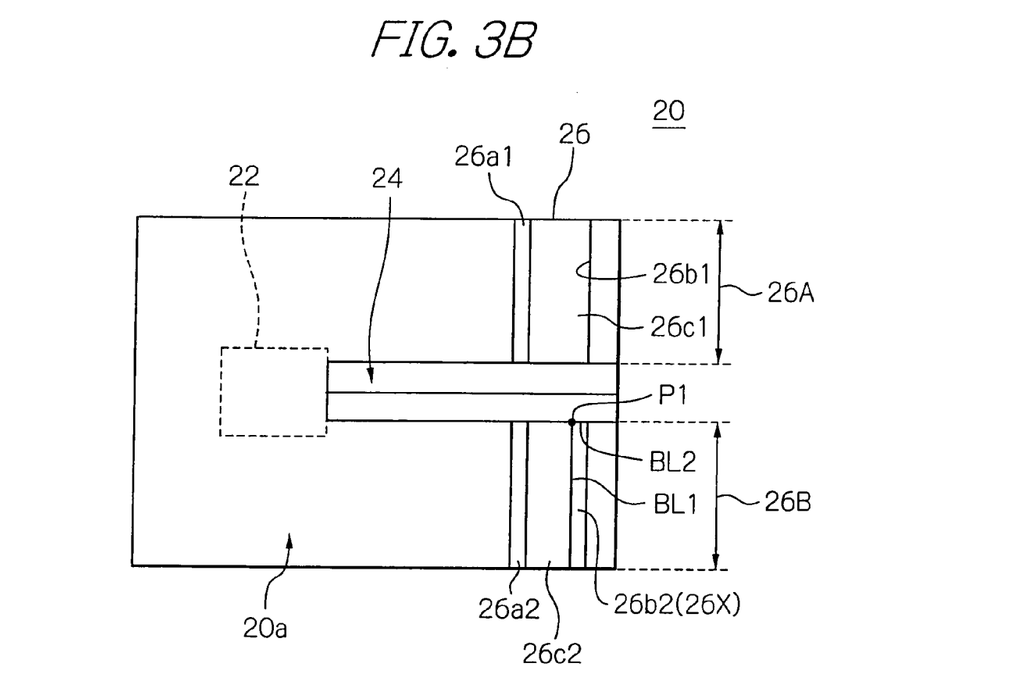
FIG. 3B is a schematic plan view of the substrate as viewed from the above in FIG. 3A.
Figure 4A:
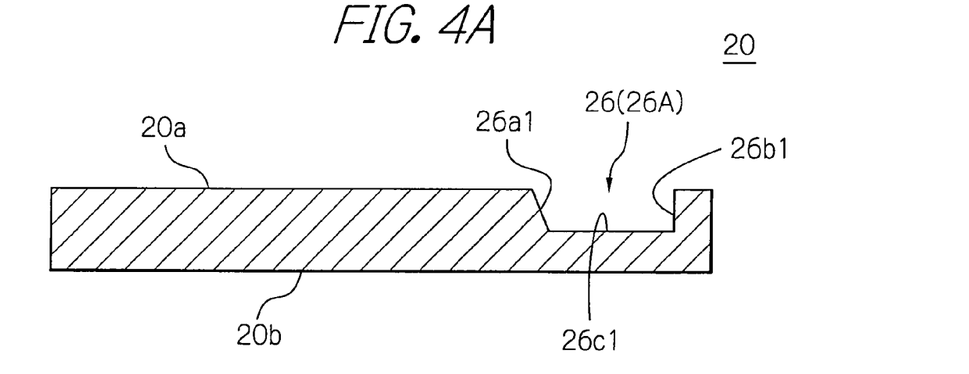
FIG. 4A is a cross sectional view taken along the dot and dash line IVA-IVA in FIG. 3A.
Figure 4B:
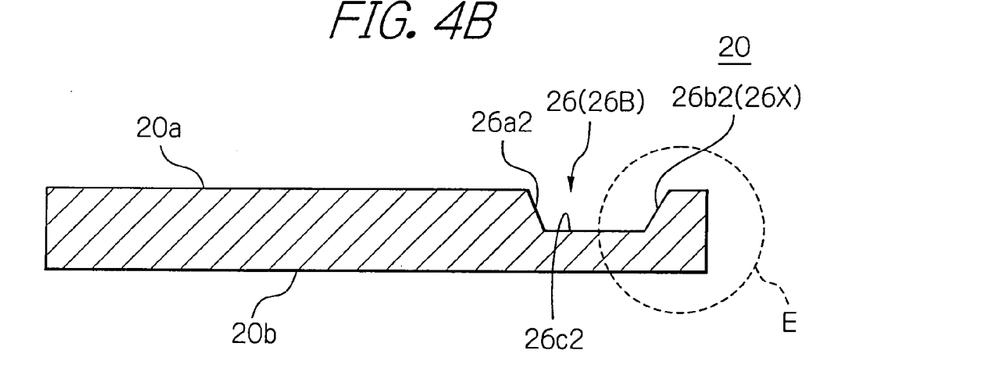
FIG. 4B is a cross sectional view taken along the dot and dash line IVB-IVB in FIG. 3A.
Figure 4C:
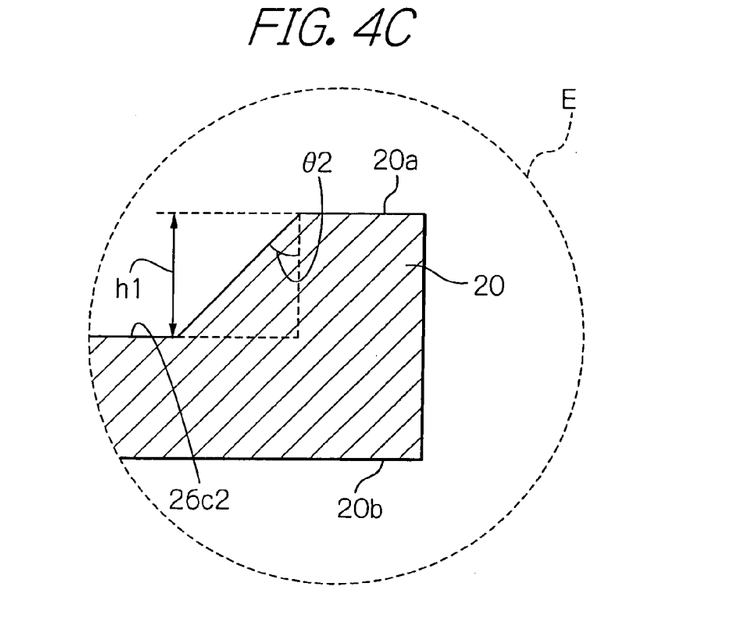
FIG. 4C is an enlarged view showing the area encircled by a dotted line E in FIG. 4B.
Figure 5A:
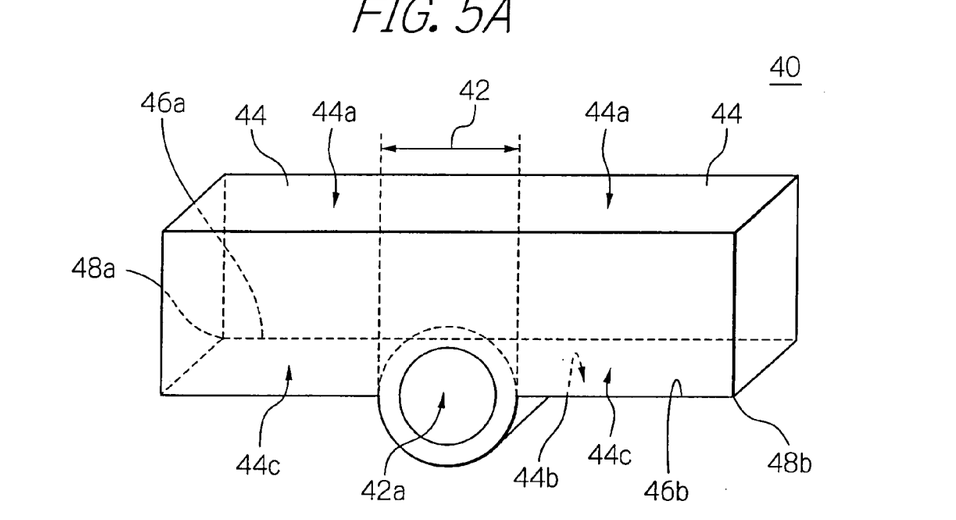
FIG. 5A is a schematic view of a lens element suitably applied to the optical module shown in FIGS. 1A and 1B.
Figure 5B:
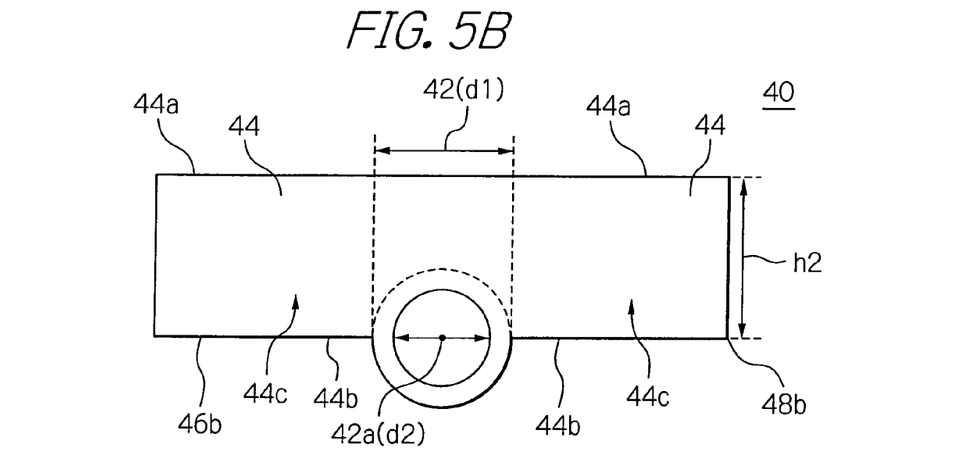
FIG. 5B is a schematic side view of the lens element shown in FIG. 5A.
Figure 5C:
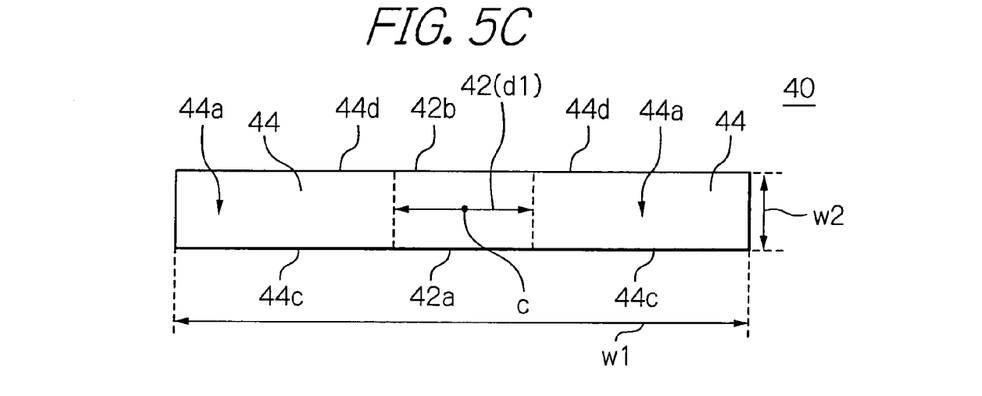
FIG. 5C is a top view of the lens element as viewed from the above in FIG. 5A.

In addition, also with reference to FIGS. 3A through 5C, the configuration of the embodiment will be described with respect to a substrate and a lens element included in the optical module. FIG. 3A is a schematic perspective view of a substrate suitably applied to the optical module of the embodiment, and FIG. 3B illustrates the substrate as viewed from the above in FIG. 3A. FIG. 4A is a cross sectional view taken along the dot and dash line IVA-IVA in FIG. 3A, and FIG. 4B is a cross sectional view taken along the dot and dash line IVB-IVB in FIG. 3A. FIG. 4C shows, in an enlarged view, the area E encircled by a dotted line in FIG. 4B. FIG. 5A is a schematic perspective view of a lens element suitably applied to the optical module of the embodiment. FIG. 5B is a schematic side view of the lens element shown in FIG. 5A, and FIG. 5C is a top view of the lens element as viewed from the above in FIG. 5A.

The optical module 10 of the illustrative embodiment is particularly featured as including a lens element 40 fastened in a support groove 26. The optical module 10 is further featured that the lens element 40 thus fastened in the support groove 26 has its light incident plane oriented not perpendicularly to, i.e. inclined with respect to, the optical axis of incident light. It is noted that the optical module 10 of the embodiment may be used alone or as a portion of an optical communication module such as disclosed in Uekawa et al., or Hiroki Sasaki et al., described above.

As seen from FIGS. 1A and 1B, the optical module 10 includes a substrate 20. The configuration of the substrate 20 will be described in more detail referring to FIGS. 3A, 3B, and 4A to 4C. The substrate 20 includes a first generally flat principal surface 20a and a second generally flat principal surface 20b opposed in parallel to the first principal surface 20a. The substrate 20 also includes a plurality of side surfaces between the first and second principal surfaces 20a and 20b. Thus, the substrate 20 is a generally planer plate-like member.

The substrate 20 is of semiconductor, preferably of silicon. The substrate 20 may be any suitable substrate material that ensures the process accuracy of a lens mounting groove and a support groove described below and the optical properties as an optical module.

The first principal surface 20a includes a light-emitting device mounting area 22 provided thereon. The light-emitting device mounting area 22 includes a light-emitting device 60 mounted thereon. The light-emitting device 60 is in this embodiment an edge emitting type of semiconductor laser commonly used in the optical communications.

The light-emitting device mounting area 22 is provided at a position that secures the size of a light-emitting device 60 to be mounted and an appropriate length of optical path for the light-emitting device 60 and lens element 40 that are selected.

The substrate 20 includes a lens mounting groove 24 provided thereon. The lens mounting groove 24 extends from the first principal surface 20a into the thickness of the substrate 20. The lens mounting groove 24 is thus cut in the first principal surface 20a.

The lens mounting groove 24 is configured as a linear groove having its lateral cross section formed in a V-shape. The lens mounting groove 24 has its depth and the angle of the V shape which may be of any suitable values selected with factors such as the diameter of the optical fiber optically coupled to the optical module 10 and the diameter of the lens element 40, particularly a lens 42, assembled in the groove 24 taken into account.

The lens mounting groove 24 is provided extending from one of the end portions of the light-emitting device mounting area 22 to one of the side surfaces of the substrate 20, as depicted in the figures. The lens groove 24 extends in the same direction as the optical axis of signal light generated from the light-emitting device 60. In other words, the light-emitting device 60 is mounted in the light-emitting device mounting area 22 so that generated signal light has its optical axis in common to the extending direction of the lens mounting groove 24.

In the context, the optical axis means the direction of the chief ray of a light flux. The direction of the chief ray of a light flux means the extending direction of the light ray as which the light flux can be approximated.

The substrate 20 also includes the support groove 26. The support groove 26 is provided in the first principal surface 20 in the from of recess that is cut into the thickness of the substrate 20.

As can be seen from FIGS. 3A and 3B, the support groove 26 is a linear groove. The support groove 26 extends in a direction substantially orthogonal to the lens mounting groove 24. In this embodiment, the support groove 26 has its depth h1, FIG. 4C, less than the deepest portion of the lens mounting groove 24.

Referring to FIG. 2, the support groove 26 has its extending length L1, width L2, and the width of its bottom surfaces 26c1 and 26c2 selectable from any suitable values that may implement a predetermined inclination $\theta 1$ established when the lens element 40 is mounted thereon. Referring to FIG. 4C, the depth h1 of the support groove 26 may be sufficiently high to the extent that, when the lens element 40 is mounted, its lens support portion 44 will not go over the support groove 26, preferably be equal to or more than, for example, one-fourth of the height of the lens support portion 44.

The support groove 26 intersects with the lens mounting groove 24. The support groove 26 is divided by the lens mounting groove 24 into two subareas, i.e. a first portion 26A and a second portion 26B. As shown in FIG. 3B, in this embodiment, the upper part in the figure shows the first portion 26A, and the lower part shows the second portion 26B. Note that the first and second portions 26A and 26B are named merely for convenience of description. It is not intended to fix the orientation of both portions.

As can be seen particularly from FIGS. 4A and 4B, the support groove 26 has its lateral cross section quadrangular. Specifically, the support groove 26 is defined by a generally flat bottom surface 26c, a first side surface 26a towards the light-emitting device mounting area 22, and a second side surface 26b opposed to the first side surface 26a. More specifically, the bottom surface 26c includes a first bottom surface 26c1 in the first portion 26A and a first bottom surface 26c2 in the second portion 26B. The first side surface 26a includes a first side surface 26a1 in the first portion 26A and a first side surface 26a2 in the second portion 26B. The second side surface 26b includes a second side surface 26b1 in the first portion 26A and a second side surface 26b2 in the second portion 26B.

Either one of the first side surface 26a, i.e. the first side surfaces 26a1 and 26a2, and the second side surface 26b, i.e. the second side surfaces 26b1 and 26b2, of the support groove 26 is nominated as an inclined surface 26X which will be used when the lens element 40 is assembled on the substrate 20, as will be described in more detail below. In this example, the second side surface 26b2 in the second portion 26B is defined as the inclined surface 26X.

The angle formed by the inclined surface 26X with respect to the normal to the bottom surface 26c, i.e. the inclining angle $\theta 2$, may be of any suitable value selected in a range in which, when fabricating the lens element 40 on the substrate 20, the inclination $\theta 1$ is implemented as designed, which will be described in more detail below.

The inclined surface 26X causes the area of the bottom surface 26c2 in the second portion 26B of the lens mounting groove 24 to be reduced.

As shown in FIG. 3C, the inclined surface 26 is defined by a first boundary BL2 formed between the inclined surface 26 and the lens mounting groove 24 and by a second boundary BL1 formed by the inclined surface 26 and the bottom surface 26c2. The first and second boundaries BL1 and BL2 intersect at an intersection P1.

The angles formed by the three side surfaces except the inclined surface 26X with respect to the normal to the bottom surface 26c may be of any suitable value that ensures the inclination $\theta 1$ of the lens element 40 with respect to the support groove 26 as shown in FIG. 2.

In this embodiment, the second side surface 26b1 has its inclination equal to zero, i.e. forms a wall vertical to the bottom surface 26c. The first side surfaces 26a1 and 26a2 may arbitrarily inclined, i.e. the inclinations thereof may be the same as or different from each other.

The lens mounting groove 24 and the support groove 26 in the substrate 20 may be sized as exemplified below. The lens mounting groove 24 may have its width Y1 approximately equal to 128 µm. The support groove 26 may have its total length L1 approximately equal to 600 µm, its width L2 approximately to 150 µm, the height, i.e. depth h1 approximately to 38 µm, and its inclining angle θ2 approximately to 10°, see FIGS. 2 and 4C.

Referring to FIGS. 1A, 1B, and 2, the optical module 10 includes the lens element 40. As seen from FIGS. 5A, 5B, and 5C, the lens element 40 includes the lens per se 42 and the lens support portion 44 integrated with the lens 42.

The lens support portion 44 is formed as a generally linear columnar member extending substantially in parallel with a light incident plane 42a or a light exit plane 42b, both of which are flat. The lens support portion 44 is referred to also as a handling portion, which will be used when the lens element 40 is assembled on the substrate 20.

The lens support portion 44 includes, in this embodiment, a support top surface 44a, a support bottom surface 44b opposite to the support top surface 44a, and a first and a second side surface 44c and 44d, all of which may be rectangular. The first and second side surfaces 44c and 44d are opposed to each other across the support bottom surface 44b. In this embodiment, from the support bottom surface 44b, the side surfaces of the cylindrical lens 42 have a portion protruding in the form of convex.

The lens element 40 includes the lens per se 42. The lens 42 is defined by the light incident plane 42a and the light exit plane 42b opposite to the light incident plane 42a. The lens 42 suitably applicable to the optical module 10 of the invention may of the type having either one or both of the light incident plane 42a and the light exit plane 42b formed generally flat. In the specific illustrative embodiment, the lens 42 has its incident plane 42a serving as a transmission diffraction type of lens using a diffraction phenomenon caused by the successive-plane structure and its exit end plane 42b formed generally flat.

To the lens element 40, preferably applicable is, for example, a silicon micro lens made of silicon fabricated through the wafer process. The lens element 40, when fabricated in the form of silicon micro lens, may be of the size described as follows, with reference to FIGS. 5B and 5C. The lens element 40 may have its diameter d2 approximately in the range of 125 µm to 250 µm. The lens element 40 may have its total length w1 including the lens support portion 44 approximately in the range of 500 µm to 800 µm. The lens element 40 may have its width w2 equal to approximately 100 µm. The lens support portion 44 may have its height h2 approximately in the range of 150 µm to 300 µm.

In this embodiment, the lens element 40 is fastened in contact with the following three points: a first contact point P1 that is the intersection P1 in the lens mounting groove 24, a second contact point P2 on the second side surface 26b1, and a third contact point P3 on the first side surface 26a2. The lens element 40 is thus mounted at the inclining angle θ1 with respect to the extending direction of the support groove 26.

The lens element 40 may be bonded in the lens mounting groove 24, for example, in an ordinary manner with a conventional binding material or solder paste.

Viewing from the side of lens element 40, a contact is made with the intersection P1 where the first boundary BL2 between the inclined surface 26X and the lens mounting groove 24 intersects the second boundary BL1 between the inclined surface 26X and the bottom surface 26c2 by an edge formed by the support bottom surface 44b and the side surface opposed to the inclined surface 26X, i.e. the side surface 44d in this example, of the lens support portion 44, namely a first edge 46a, FIG. 5A.

The lens element 40 has an apex 48a, FIG. 5A, of the first edge 46a. The apex 48a is fastened in contact with the second side surface 26b1 which is provided in the first portion 26A opposite to the inclined surface 26X across the lens mounting groove 24 on the same side surface as the inclined surface 26X.

The value of angle θ1 is measured with respect to the position at which the incident plane 42a and/or the exit end plane 42b that is or are perpendicular to the optical axis. When the plane 42a and/or 42b is or are tilted or rotated clockwise in the first principal surface 20a, the value θ1 is defined positive. When the plane 42a and/or 42b is or are tilted anticlockwise in the first principal surface 20a, the value θ1 is defined negative. Therefore, when the lens element 40 has its inclining angle θ1 negative, an apex opposed to the apex 48a is in contact with the side surface 26a1 opposed to the side surface 26b1.

The contact thus made with at least two points fastening the lens element 40 in the support groove 26 allows the lens element 40 to be more stably fixed on the substrate 20 with the inclining angle θ1 being ensured.

In the lens element 40, the bottom surface 44b of the lens element support portion 44 and the first side surface 44c not opposed to the inclined surface 26X define a second edge 46b. An apex 48b of the second edge 46b is in contact with the first side surface 26a2 opposed to the inclined surface 26X. When the inclining angle θ1 is negative, an apex opposed to the apex 48b is in contact with the side surface 26b2 opposed to the side surface 26a2.

The contact thus made with three points to fasten the lens element 40 in the support groove 26 more reliably ensures the determination of the inclining angle θ1 and the fastening of the lens element 40 on the substrate 20.

In short, the lens element 40 is fastened in contact with at least the intersection P1, as described above. The lens element 40 may be adapted to be in contact with the substrate, preferably at two points, i.e. the first and second contact points P1 and P2, and more preferably at three points, i.e. the first, second, and third contact points of P1, P2, and P3. The lens element 40, thus mounted, allows the incident plane 42a and the exit end plane 42b of the lens 42 to be exposed in the lens mounting groove 24.

It is assumed that, when the lens 42 of the lens element 40 has the diameter d2 of, for example, 125 µm as described above, a distance LAX from the exit end plane 62 of the light-emitting device 60 to the light incident plane 42a of the lens 42 is equal to approximately 80 µm. It is also assumed that, when the diameter d2 is equal to approximately 250 µm, the distance LAX from the exit end plane 62 to the light incident plane 42a is equal to approximately 160 µm, see FIG. 1B. Specifically, referring to FIG. 2, the lens element 40 is tilted, particularly in the first principal surface 20a, so that the flat surface formed by either one or both of the incident plane 42a and the exit end plane 42b is not perpendicular to the optical axis.

The value of the inclining angle θ1 is selected such that the exit light outgoing from the light-emitting device 60 and reflected by the flat surface formed by the flat surface formed by either one or both of the incident plane 42a and the exit end plane 42b can be prevented from returning to the exit end plane 62 of the light-emitting device 60.

The inclining angle θ1 may be determined by taking into account, for example, the reflection coupling efficiency. The relationship between the reflection coupling efficiency (in decibel, dB) and the inclining angle θ1 (in degree, °) will be described with reference to FIG. 6. The following description is based upon an example where the lens 42 has its diameter d2 equal to 125 µm and the distance LAX from the exit end plane 62 to the light incident plane 42a of the lens 42 is 80 µm.

Figure 6:
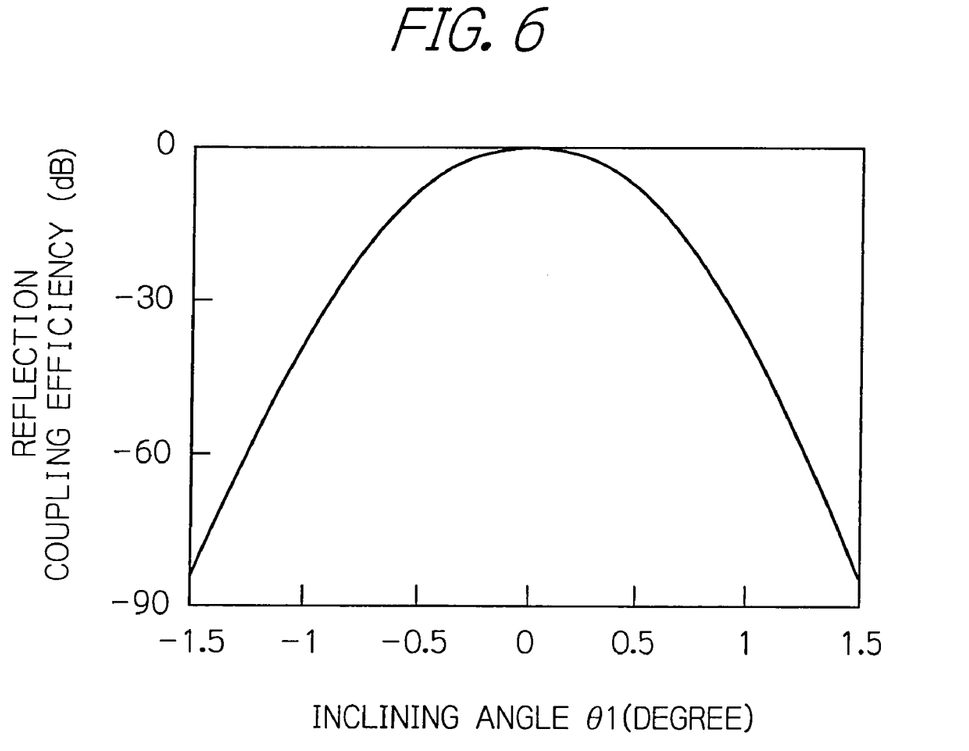
FIG. 6 is a graph showing a relationship between a reflection coupling efficiency and an inclining angle according to the illustrative embodiment.

As can be seen from FIG. 6, the reflection coupling efficiency has its peak, i.e. 0 dB, at the inclining angle of 0°. The reflection coupling efficiency is thus expressed as a curve of upward-convex and spindle-shape.

The reflection coupling efficiency down to approximately −34.7 dB may be accepted. Specifically, the inclining angle θ1 preferably falls within the range of approximately ±1° provided that the property of the optical signal through the lens element 40 is not reduced.

When the lens element 40 is oriented not in parallel to the extending direction of the support groove 26 to set the inclining angle θ1 to a value set forth above, light reflected from the lens element 40 is not incident on the exit end plane 62 of the light-emitting device 60. A phenomenon causing an unstable oscillation is thereby effectively prevented, and the optical signal may be transmitted more stably with the property of the optical signal through the lens element 40 being in tolerance.

Figure 7A:
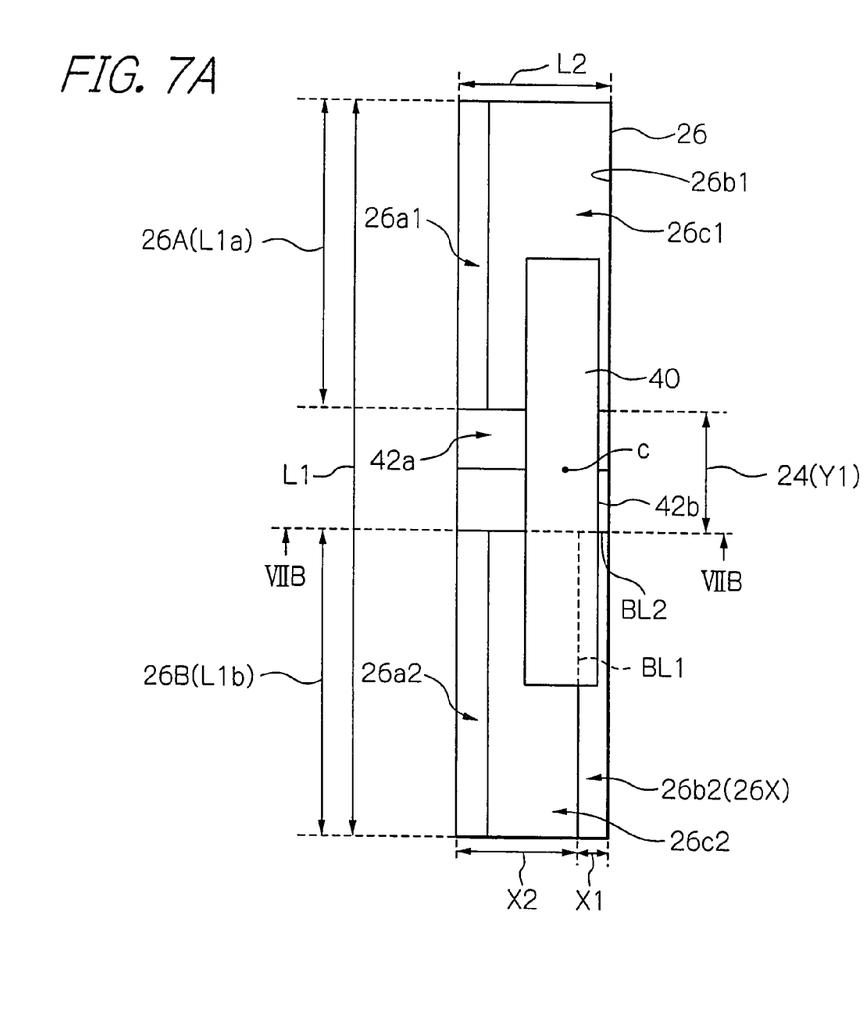
FIG. 7A is the top view of the groove of the substrate for use in understanding a method of assembling the lens element on the substrate according to the embodiment.
Figure 7B:
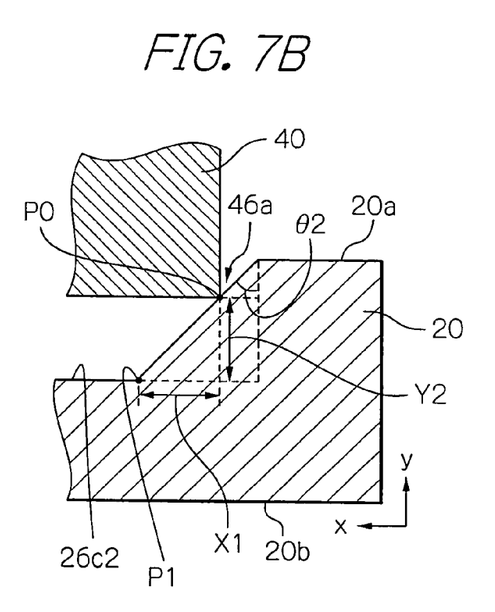
FIGS. 7B and 7C are enlarged views showing a portion of the cross section taken along the VIIB-VIIB in FIG. 7A, useful for understanding the manufacturing method according to the illustrative embodiment.
Figure 7C:
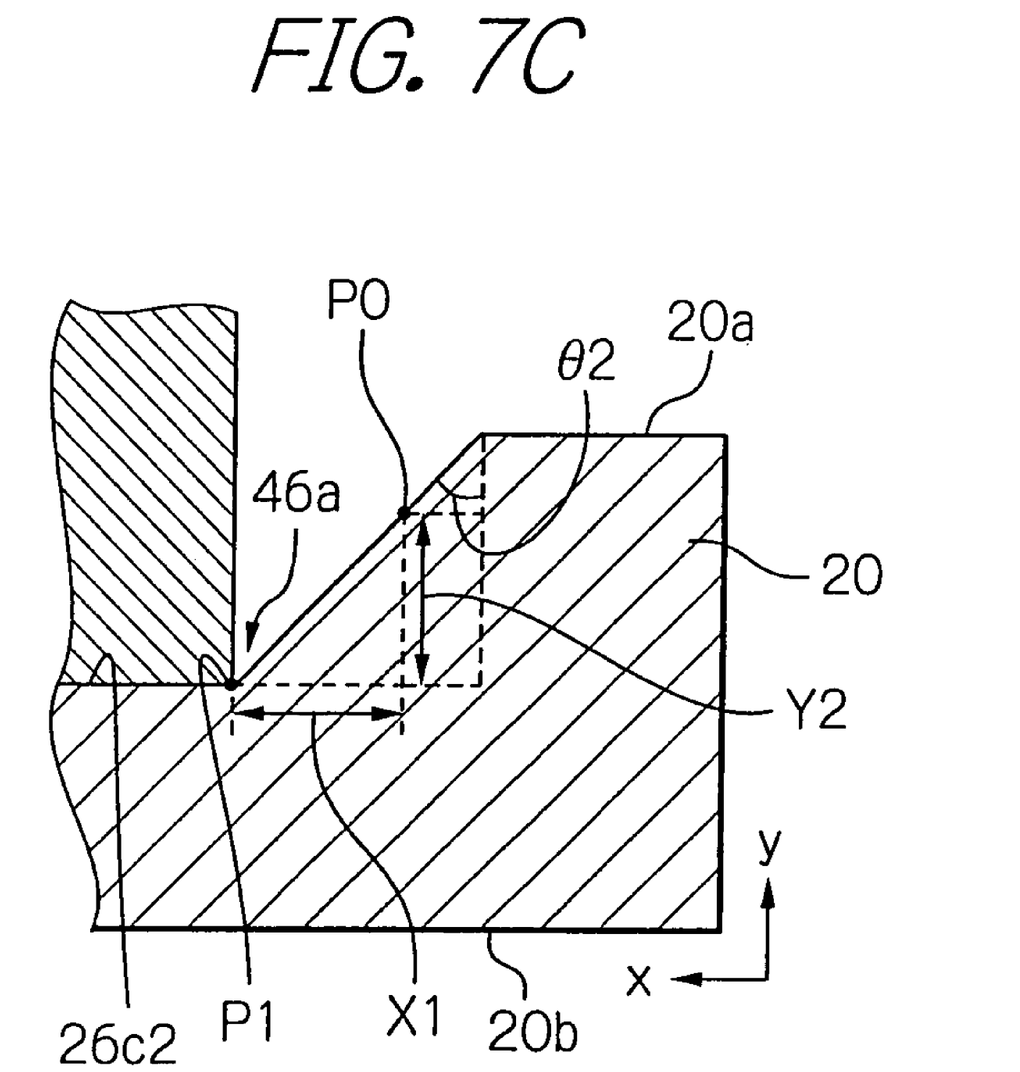

Well, referring to FIGS. 7A, 7B and 7C, a description will be given of a method of manufacturing the optical module 10 having the above-stated configuration. FIG. 7A is a schematic plan view, similar to FIG. 2, of the lens element 40 mounted on the substrate as viewed from above the grooves 24 and 26. FIGS. 7B and 7C are enlarged views of the portion of a cross section taken along the VIIB-VIIB in FIG. 7A.

In a method of manufacturing the optical module 10, the light-emitting device 60 and the lens element 40 may be mounted using a conventional mounting tool. Because the configuration per se of the mounting tool 10 is not essential to the invention, an illustration and detailed description on such a mounting tool will be omitted here. The manufacturing, particularly mounting, process will be described on the illustrative preferred embodiment where the substrate 20 is of silicon, the lens element 40 is a silicon micro lens, and the light-emitting device 60 is an edge emitting type of semiconductor laser device.

The substrate 20 is first prepared. The substrate 20 is, as described above, a planer plate-like member. The substrate 20 is provided in advance with, on the first principal surface 20a, the light-emitting device mounting area 22. The lens mounting groove 24 and the support groove 26 in the substrate 20 may be formed remarkably accurately by, for example, a wafer process in the usual manner. Specifically, the conventional photolithographic process for forming a resist pattern and etching process using a resist pattern as a mask may be used to pattern the wafer 20 into a desired size and shape. The desired size and shape are determined taking into account the optical path length and the optical properties of the light-emitting device 60 and the lens element 40 and the like.

The light-emitting device 60 is provided in advance which has the exit end plane for exit light, i.e. the edge emitting type of semiconductor laser device in this example.

The lens element 40 is also prepared. The lens element 40 includes, as described above, the lens 42 and the columnar lens support portion 44 integrated with the lens 42. The lens 42 includes a flat surface formed by either one or both of the light incident plane 42a and the light exit plane 42b.

The light-emitting device 60 is assembled onto the substrate 20 in the light-emitting device mounting area 22. The bottom surface of the light-emitting device 60 is applied with a binding material, solder paste or the like in advance. The light-emitting device 60 is fixed into the mounting area 22 so that the optical axis of exit light is substantially the same as the extending direction of the lens mounting groove 24. The mounting process may be carried out with a conventional mounting tool in the usual manner.

The lens element 40 is set on the lens mounting groove 24. This mounting process may be carried out with the same mounting tool for use in mounting the light-emitting device 60 at the same time as mounting the light-emitting device 60.

The lens element 40 is supported by the mounting tool immediately above the lens mounting groove 24. The supporting is performed so that the lens element 40 may be rotated clockwise or anticlockwise about the rotational axis C shown in FIG. 5C, and the top surface 44a is substantially parallel with the first principal surface 20a and the bottom surface 26c of the support groove 26. In the process where the lens element 40 is being assembled onto the substrate 20, the rotational axis C itself remains unmoved.

The lens element 40 is then descended until it becomes in contact with, in the second portion 26B, the landing point P0, i.e. the inclined surface 26X so that, in this embodiment, the first edge 46a is substantially parallel with the second boundary BL1. If the inclined surface 26X stays on the opposed surface 26a2, it is then preferable to bring the second edge 46b into contact with the inclined surface 26X. A portion of the first edge 46a that resides in the first portion 26A then remains, in a space within the support groove 26, out of contact with the remaining structures.

The lens element 40 is further descended in the extending direction of the rotational axis C, i.e. substantially perpendicular to the first principal surface 20a.

Then, a portion of the first edge 46a of the lens element 40 that resides in the second portion 26B is pressed downward, sliding along the surface of the inclined surface 26X. Also, a portion of the lens element 40 that resides in the second portion 26B, i.e. the second apex 48b rotates about the rotational axis C in the direction of an arrow A shown in FIG. 1B. At the same time, a portion of the lens element 40 that resides in the first portion 26A, i.e. the first apex 48a rotates in the direction of an arrow B.

The rotation stops when the support bottom surface 44b of the lens element 40 is brought into contact with the bottom surface 26c of the support groove 26. At least the first edge 46a is then in contact with the intersection P1.

The rotation may stop, preferably at the same time as the first apex 48a is in contact with the second side surface 26b1, i.e. as the second contact point P2 occurs, and more preferably, at the same time as the second apex 48b is in contact with the first side surface 26a2, i.e. as the third contact point P3 occurs.

A side surface that is on the same side as the plane 26X across the lens mounting groove 24, i.e. the second side surface 26b1 in this embodiment, and a side surface opposed to the inclined surface 26X, i.e. the second side surface 26a2 in this embodiment, need to be spaced sufficiently apart from each other so that the lens element 40 can rotate by at least the angle θ1.

By the processes set forth above, the lens element 40 is mounted in the support groove 26 so that the optical axis faces the light incident plane 42a and the element 40 has the inclining angle θ1, i.e. the flat surface of the lens 42 is not perpendicular to the optical axis. The inclining angle θ1 is determined so that light reflected from the lens 42 would not be incident on the exit end plane 62 of the light-emitting device 60 but the optical signal through the lens element 40 could be reliably transmitted to a device or the like residing at the next stage.

A description will now be given of the landing point P0 still with reference to FIGS. 7A, 7B and 7C. The inclining angle θ1 is determined, depending on the optical properties of the lens element 40 and the light-emitting device 60, in a range where light reflected from the lens element 40 does not return to the light-emitting device 60 but signal light through the lens element 40 is reliably transmitted to the next stage device. The inclining angle θ2 of the inclined surface 26X may be of an arbitrary value. The width Y1 of the lens mounting groove 24 and the depth h1 of the support groove 26 depend on the lens element 10 used.

It is now assumed here that the x-axis is parallel to the first principal surface 20a, and the y-axis is perpendicular to the first principal surface 20a. A time point t0 is defined as the time when the edge 46a is brought into contact with, on the boundary BL2, the landing point P0, FIG. 7B, and a time point t1 is as the time when the edge 46a reaches the intersection P1, FIG. 7C. X1 denotes an x-axis component of the distance from t0 to t1, and Y1 does a y-axis component of the distance. The values θ1, X1, Y1, and Y2 may be expressed by $$\theta 1 = \tan(X1/Y1) \tag{1}.$$

The value X1 may be expressed by $$X1 = Y2 \times \tan \theta 2 \tag{2}.$$

The designed sizes of the substrate 20 and the lens element 40, the inclining angle θ1 set, and the above expressions may be used to determine the landing point P0 or its critical point.

When X1 is sufficiently large, i.e. the landing point P0 is higher than the calculated critical point, the inclining angle θ1 may be determined uniquely by the above procedure. Whenever the landing point P0 is lower than the calculated critical point, however, the inclining angle θ1 is lower than the setting value.

The substrate 20 manufactured by means of the parameters thus determined is used so that the lens element 40 is slid along the inclined surface 26X of the support groove 26 for assembling. The position at which the lens element 40 is mounted, in other words, the inclining angle θ1 of the light incident plane 42a of the lens element with respect to the optical axis, may be accurately provided only by the fabricating process without additional tools or processes.

The entire disclosure of Japanese patent application No. 2006-270004 filed on Sep. 29, 2006, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. An optical module comprising:
   a substrate having a first principal surface and a second principal surface opposed to the first principal surface,
   the first principal surface having a light-emitting device mounting area, a lens mounting groove with a cross section of generally V shape, and a support groove formed substantially orthogonal to the lens mounting groove,
   the support groove having a bottom surface, a first side surface toward the light-emitting device mounting area, and a second side surface opposed to the first side surface,
   the support groove being divided into a first portion and a second portion by the lens mounting groove;
   a light-emitting device having an exit end plane for exit light, said light-emitting device being mounted in the light-emitting device mounting area; and
   a lens element comprising,
   (a) a lens having a light incident plane and a light exit plane opposed to the light incident plane, either one or both of the light incident plane and the light exit plane forming a generally flat surface, the light incident plane being opposed to the exit end plane of said light-emitting device, an optical axis of exit light from the exit end plane reaching the light incident plane, said lens being mounted in the lens mounting groove, and
   (b) a columnar lens support portion integrated with said lens, said lens support portion extending substantially in parallel with the flat surface formed by the light incident plane or the light exit plane, said lens support portion having a support bottom surface and a first and a second side surface that are opposed across the support bottom surface, said lens support portion being fastened with the support bottom surface in contact with the bottom surfaces of the first and second portions of the support groove,
   either one of the first and second side surfaces of the first portion of the support groove being provided as an inclined surface that has a slope reducing an area of the bottom surface,
   the flat surface of said lens being not perpendicular to the optical axis, said lens element being oriented not in parallel to an extending direction of the support groove at an angle where light reflected from said lens element is not incident on the exit end plane of said light-emitting device.

2. The optical module in accordance with claim 1, wherein said substrate is made of silicon.

3. The optical module in accordance with claim 1, wherein the flat surface formed by one or both of the light incident plane and the light exit plane is oriented not in parallel to the optical axis of exit light to provide a reflection coupling efficiency of −34.7 dB or less.

4. The optical module in accordance with claim 1, wherein the flat surface formed by one or both of the light incident plane and the light exit plane is oriented at an angle of 1° to the optical axis of exit light.

5. The optical module in accordance with claim 1, wherein said lens is of a diffractive type.

6. The optical module in accordance with claim 5, wherein said lens is a silicon microlens made of silicon.

7. An optical module comprising:
   a substrate having a first principal surface and a second principal surface opposed to the first principal surface, and a plurality of side surfaces between the first and second principal surfaces,
   the first principal surface having a light-emitting device mounting area, a lens mounting groove with a cross section of generally V shape, the lens mounting groove being provided from the first principal surface into a thickness of said substrate and extending from an end portion of the light-emitting device mounting area to one of the side surfaces, and a support groove formed substantially orthogonal to the lens mounting groove from the first principal surface into a thickness of said substrate,
   the support groove having a bottom surface, a first side surface toward the light-emitting device mounting area, and a second side surface opposed to the first side surface, the support groove being divided into a first portion and a second portion by the lens mounting groove;

a light-emitting device having an exit end plane for exit light, said light-emitting device being mounted in the light-emitting device mounting area with an optical axis of exit light being coincident with an extending direction of the lens mounting groove; and a lens element comprising, (a) a lens having a light incident plane and a light exit plane opposed to the light incident plane, either one or both of the light incident plane and the light exit plane forming a generally flat surface, the light incident plane being opposed to the exit end plane of said light-emitting device, the optical axis of exit light from the exit end plane reaching the light incident plane, said lens being mounted in the lens mounting groove, and (b) a columnar lens support portion integrated with said lens, said lens support portion extending substantially in parallel with the light incident plane, said lens support portion having a support bottom surface and a first and a second side surface that are opposed across the support bottom surface, said lens support portion being fastened with the support bottom surface in contact with the bottom surfaces of the first and second portions of the support groove, either one of said first and second side surfaces of the first portion of the support groove being an inclined surface that has a slope reducing an area of the bottom surface, said lens element contacting an edge formed by the support bottom surface of said lens support portion and a side surface opposed to the inclined surface to an intersection where a first boundary between the inclined surface and the lens mounting groove intersects a second boundary between the inclined surface and the bottom surface, the flat surface of said lens being not perpendicular to the optical axis, said lens element being oriented not in parallel to an extending direction of the support groove at an angle where light reflected from said lens element is not incident on the exit end plane of said light-emitting device.

8. The optical module in accordance with claim 7, wherein said substrate is made of silicon.

9. The optical module in accordance with claim 7, wherein the flat surface formed by one or both of the light incident plane and the light exit plane is oriented not in parallel to the optical axis of exit light to provide a reflection coupling efficiency of −34.7 dB or less.

10. The optical module in accordance with claim 7, wherein the flat surface formed by one or both of the light incident plane and the light exit plane is oriented at an angle of 1° to the optical axis of exit light.

11. The optical module in accordance with claim 7, wherein said lens is of a diffractive type.

12. The optical module in accordance with claim 11, wherein said lens is a silicon microlens made of silicon.

13. A method of manufacturing an optical module comprising the steps of:

preparing a substrate having a first principal surface and a second principal surface opposed to the first principal surface, the first principal surface having a light-emitting device mounting area, a lens mounting groove with a cross section of generally V shape, and a support groove formed substantially orthogonal to the lens mounting groove, the support groove having a bottom surface, a first side surface toward the light-emitting device mounting area, and a second side surface opposed to the first side surface, the support groove being divided into a first portion and a second portion by the lens mounting groove, either one of the first and second side surfaces of the first portion of the support groove being an inclined surface that has a slope reducing an area of the bottom surface;

preparing a light-emitting device having an exit end plane for exit light;

preparing a lens element comprising, (a) a lens having an incident plane and a light exit plane opposed to the light incident plane, either one or both of the light incident plane and the light exit plane forming a generally flat surface, and (b) a columnar lens support portion integrated with the lens, the lens support portion extending substantially in parallel with the flat surface formed by the light incident plane or the light exit plane, the lens support portion having a support bottom surface and a first and a second side surface that are opposed across the support bottom surface;

mounting the light-emitting device in the light-emitting device mounting area with an optical axis of exit light coincident with an extending direction of the lens mounting groove; and opposing the incident plane to the exit end plane of the light-emitting device mounted in the light-emitting device mounting area so that the optical axis reaches the light incident plane, and rotating and moving the lens element, and setting the flat surface of the lens not perpendicular to the optical axis, and orienting the lens element being not in parallel to the extending direction of the support groove at an angle where light reflected from the lens element would not be incident on the exit end plane of the light-emitting device to provide the lens element in the lens mounting groove.

14. The method in accordance with claim 13, wherein said step of providing the lens element in the lens mounting groove comprises the substep of rotating and moving the lens element until an apex of the first edge contacts with the first or second side surface in the first or second portion that is opposite across the lens mounting groove to the inclined surface, the first or second side surface being on a same side as the inclined surface.

15. The method in accordance with claim 13, wherein said step of providing the lens element in the lens mounting groove comprises the substep of rotating and moving the lens element until an apex of a second edge contacts with the first or second side surface opposed to the inclined surface, the second edge being defined by the bottom surface of the lens element support portion and the first or second side surface not opposed to the inclined surface.

16. A method of manufacturing an optical module comprising the steps of:

preparing a substrate having a first principal surface and a second principal surface opposed to the first principal surface, and a plurality of side surfaces between the first and second principal surfaces, the first principal surface having a light-emitting device mounting area, a lens mounting groove with a cross section of generally V shape, the lens mounting groove being provided from the first principal surface into a thickness of the substrate and extending from an end portion of the light-emitting device mounting area to one of the side surfaces, and a support groove formed substantially orthogonal to the lens mounting groove and provided from the first principal surface into a thickness of the substrate, the support groove having a bottom surface, a first side surface toward the light-emitting device mounting area, and a second side surface opposed to the first side surface, the support groove being divided into a first portion and a second portion by the lens mounting groove, either one of the first and second side surfaces of the first portion of the support groove being an inclined surface that has a slope reducing an area of the bottom surface, the support groove having an intersection where a first boundary between the inclined surface and the lens mounting groove and a second boundary between the inclined surface and the bottom surface intersect;

preparing a light-emitting device having an exit end plane for exit light;

preparing a lens element comprising, (a) a lens having an incident plane and a light exit plane opposed to the light incident plane, either one or both of the light incident plane and the light exit plane forming a generally flat surface, and (b) a columnar lens support portion integrated with the lens, the lens support portion extending substantially in parallel with the flat surface formed by the light incident plane or the light exit plane, the lens support portion having a support bottom surface and a first and a second side surface that are opposed across the support bottom surface;

mounting the light-emitting device in the light-emitting device mounting area with an optical axis of exit light coincident with an extending direction of the lens mounting groove; and opposing the incident plane to the exit end plane of the light-emitting device mounted in the light-emitting device mounting area so that the optical axis reaches the light incident plane, and rotating the lens element, using the first boundary as a supporting point, about an axis of the lens element that passes through a center of an extending length and a width of the lens element as viewed from above the lens element and that extends substantially perpendicular to the first principal surface of the substrate, along the first boundary and the inclined surface, and moving the lens element until a first edge contacts with the bottom surface of the support groove and the intersection where the first boundary and the second boundary intersect each other, the first edge being defined by the support bottom surface of the lens support portion and the first or second side surface opposed to the inclined surface, and setting the flat surface of the lens not perpendicular to the optical axis, and orienting the lens element at an angle where light reflected from the lens element would not be incident on the exit end plane of the light-emitting device to provide the lens element in the lens mounting groove.

17. The method in accordance with claim 16, wherein said step of providing the lens element in the lens mounting groove comprises the substep of rotating and moving the lens element until an apex of the first edge contacts with the first or second side surface in the first or second portion that is opposite across the lens mounting groove to the inclined surface, the first or second side surface being on a same side as the inclined surface.

18. The method in accordance with claim 16, wherein said step of providing the lens element in the lens mounting groove comprises the substep of rotating and moving the lens element until an apex of a second edge contacts with the first or second side surface opposed to the inclined surface, the second edge being defined by the bottom surface of the lens element support portion and the first or second side surface not opposed to the inclined surface.

* * * * *